United States Patent [19]
Pyron et al.

[11] Patent Number: 5,398,386
[45] Date of Patent: Mar. 21, 1995

[54] PROCESS FOR REJUVENATING BAGHOUSE FILTER CARTRIDGES

[76] Inventors: Donald Pyron, 2315 Edgewood, El Dorado, Ark. 71730; Henry M. Pyron, P.O. Box 723, El Dorado, Ark. 71731

[21] Appl. No.: 67,823

[22] Filed: May 27, 1993

[51] Int. Cl.6 .................. B23P 6/00; B23P 19/04; B01D 46/04
[52] U.S. Cl. .................. 29/402.07; 29/402.08; 29/452; 55/379
[58] Field of Search .......... 29/402.04–402.08, 29/402.13, 402.16, 402.19, 402.20, 235, 450, 452, 163.8; 55/302, 341.1, 341.3, 372, 379, DIG. 26; 95/279, 280, 286; 210/238, 452

[56] References Cited

U.S. PATENT DOCUMENTS

| | | | |
|---|---|---|---|
| 4,157,901 | 6/1979 | Schaltenbrand | 55/379 X |
| 4,194,894 | 3/1980 | Noland | 55/DIG. 26 X |
| 4,257,790 | 3/1981 | Berquist et al. | 55/379 |
| 4,277,874 | 7/1981 | Brown et al. | 29/235 |
| 4,435,197 | 3/1984 | Nijhawan et al. | 55/341.7 |
| 4,618,353 | 10/1986 | Reier | 29/452 X |
| 5,017,200 | 5/1991 | Price et al. | 95/286 X |

*Primary Examiner*—Peter Dungba Vo
*Attorney, Agent, or Firm*—Jerry L. Mahurin

[57] ABSTRACT

A Process and apparatus for rejuvenating baghouse filter cartridges. The first step in the process is passing cartridges from a baghouse through a cutting chamber, slitting the bags from the cages. The cutting chamber comprises a water knife angularly disposed in the wall of a tubular housing. The angle of the water knife and the size of the water knife's jet are varied according to the composition of the bags. The second step is repairing damaged cages. Bent cages are mounted upon a rigidly mounted mandrel and compressed between two hemicylindrical dies of a translational press. Broken welds on the cages are rewelded. In the last step new bags are installed on the cages. The cage is positioned over an open ended tubular manifold, and a new bag is started onto the end of the cage. Slightly pressurized, high volume, warm air pumped through the manifold inflates the bag, and the inflated bag is then pulled over the rest of the cage. The specially designed equipment to carry out the process is transported on and deployed in conjunction with a trailer having several specialized structures.

15 Claims, 4 Drawing Sheets

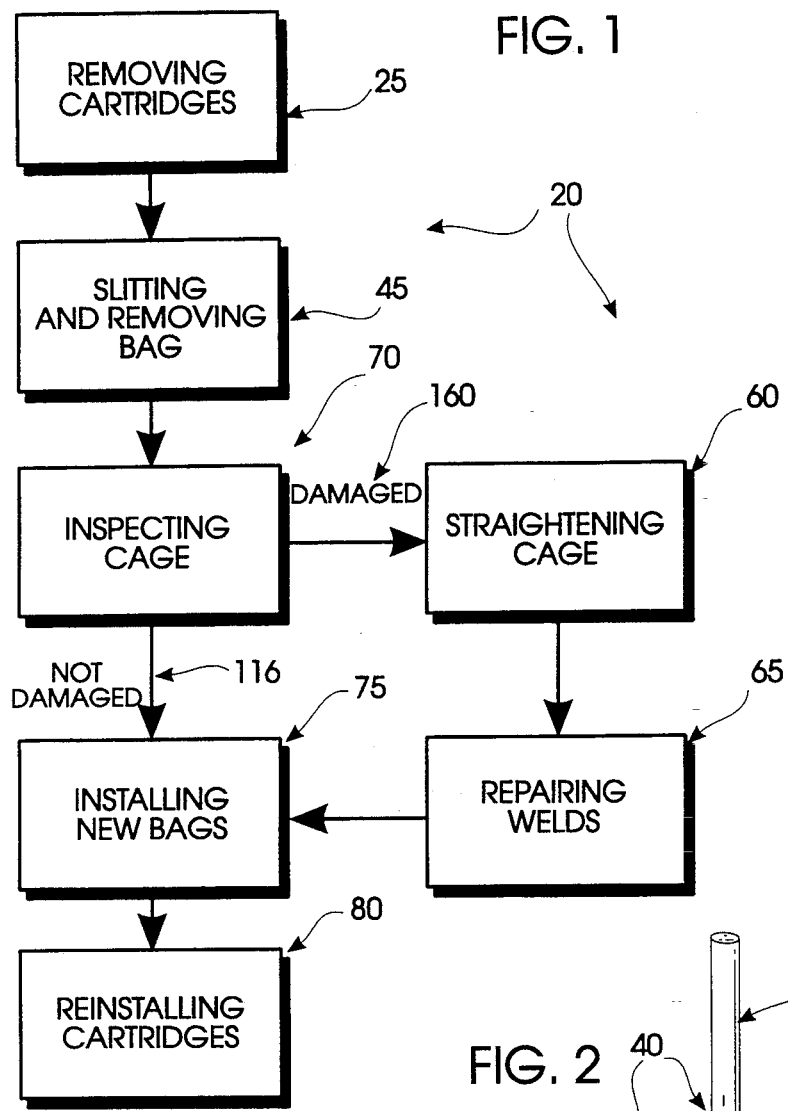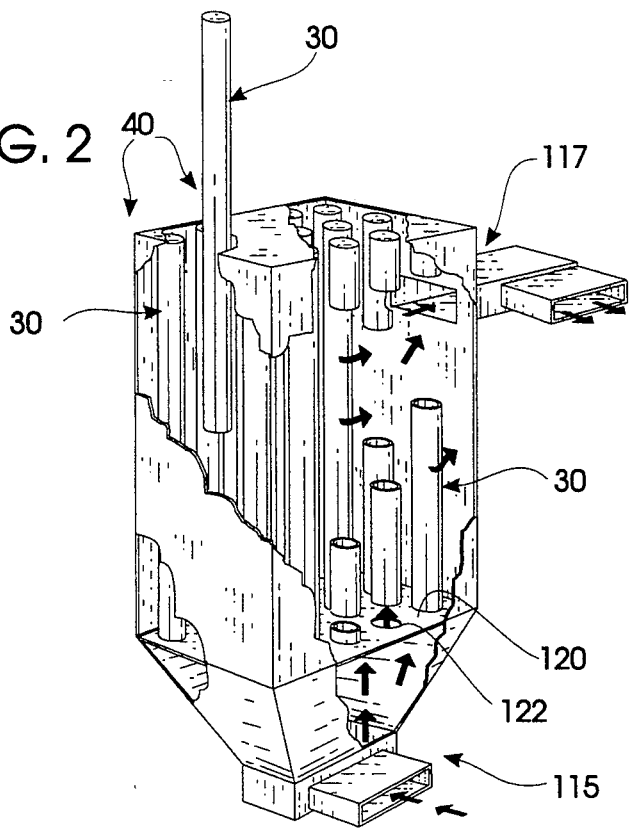

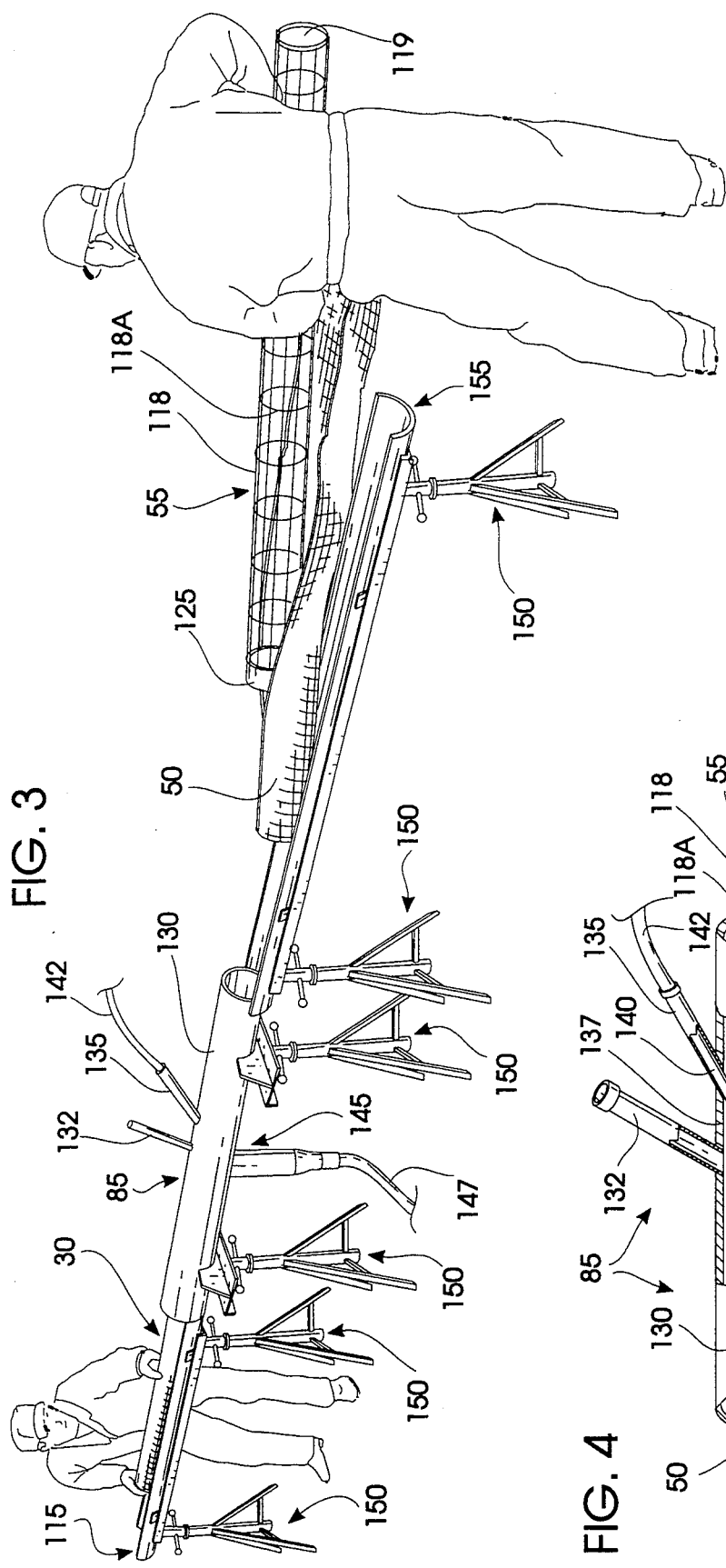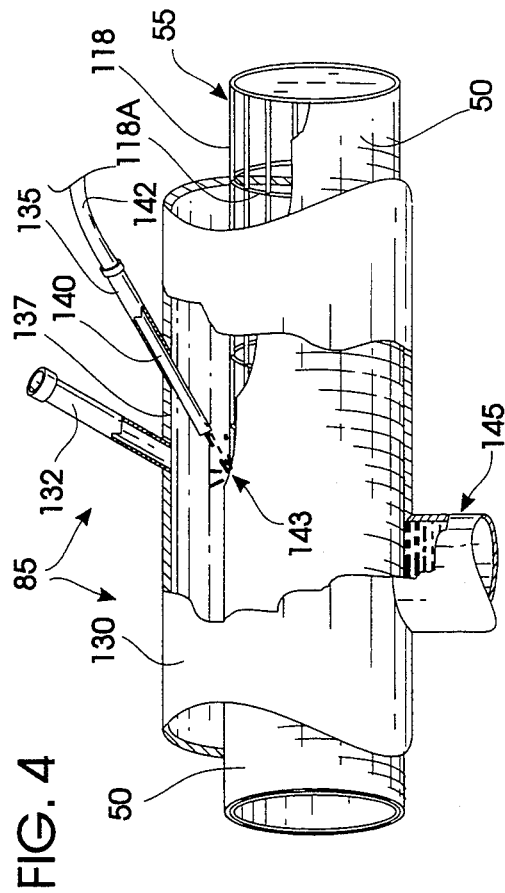

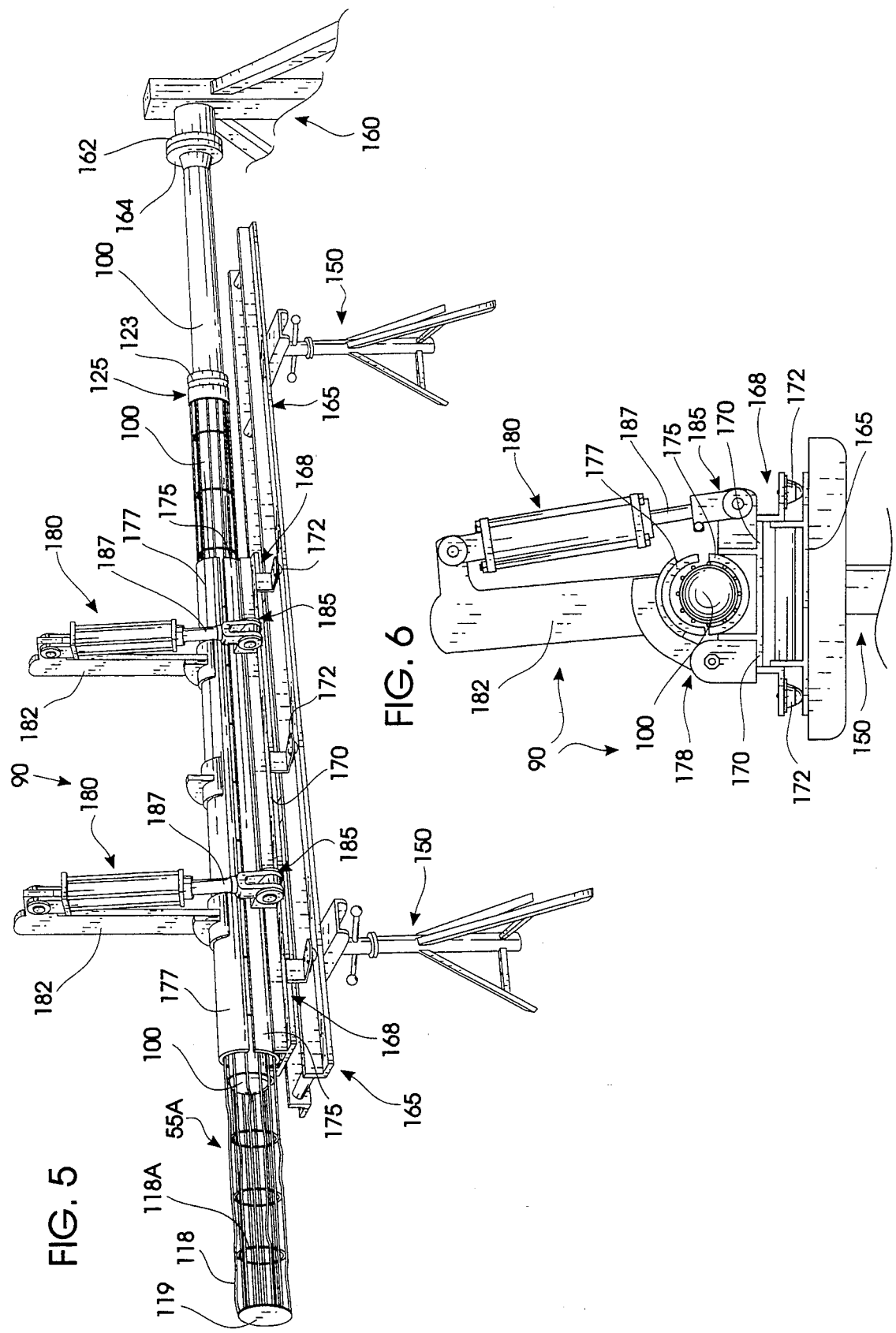

PROCESS FOR REJUVENATING BAGHOUSE FILTER CARTRIDGES

BACKGROUND OF THE INVENTION

The present invention broadly relates to baghouse filtration systems. Specifically, the present invention is a Process and Apparatus for Rejuvenating Baghouse Filter Cartridges. Art pertinent to the subject matter of the present invention can be found in U.S. Patent Class 55.

Baghouses are employed to filter particulates from air expelled by various commercial processes. Some processes employ baghouses to remove hazardous wastes before venting to the atmosphere. Other processes use baghouses to gather output product.

Most modern baghouses employ a stainless steel skeletal framework, commonly referred to as a cage, to support filter bags. Together the cage and bag form a cartridge. Various mounting systems are used to anchor these cartridges in baghouse structures. Generally speaking, the cartridges are mounted to a tube sheet which is a flat plate with a plurality of cartridge receptive orifices defined in it. The cartridges may be clamped in place. Alternatively, a series of indents or notches defined in a flange around the opening mate with grooves or ribs defined in a shroud on the open end of the cage to hold the cartridge in place. The tube sheet is mounted in the baghouse in such a manner that it separates the input gases from the output gases. Gases to be filtered pass though the bags in one direction or the other, collecting material on the outside or the inside of the bag.

Innumerable patents are directed to baghouse configurations. Birkholz, U.S. Pat. No. 1,821,202, discloses a renewable capsule filter which employs a baghouse structure having a mesh frame. More conventional, modern baghouses are disclosed in several U.S. Patents Dobyns, U.S. Pat. No. 4,976,756, discloses a dust collector with a hinged roof to facilitate cleaning and use. Heffernan, U.S. Pat. No. 4,309,200, discloses a baghouse with a collapsible filter bag assembly.

Some U.S. Patents speak directly to filter structures and the connections employed to secure the cartridge to the tube sheet. De Martino, U.S. Pat. No. 4,256,473, discloses a cylindrical collar unit used to attach a bag frame to the permanent baghouse structure. Gravley, U.S. Pat. No. 3,937,621, discloses a filter bag cuff. It is basically a ring folded within the fabric of the bag and stitched into place. Reinauer, U.S. Pat. No. 4,073,632, discloses a structure for mounting bags. This structure uses a semirigid bag with an integral framework. This patent discloses two end caps, one which allows the entrance of air and the other which supports the distal end of the bag. Miller, U.S. Pat. No. 4,042,356, discloses a baghouse cell plate and filter bag attachment. Here a structure extends outward from the baghouse cell plate with a grove in it for accepting the upper lip of a filter bag. U.S. Pat. No. 4,424,070 issued to Robinson Jan. 3, 1984, discloses a dust collecting filter cartridge and attachment structure. The attachment structure is an adapter that uses a rubber clamp to mate dissimilarly sized cartridges and tube sheets.

U.S. Pat. No. 5,095,607 issued to Simon on Mar. 17, 1992, discloses a tool for securing baghouse filters. It employs a tapered head to expand the open end flange of a baghouse filter cartridge to facilitate inserting it into the tube sheet or other framework.

Various means are employed to clear the material from the bags in the baghouse. For example, Bundy, U.S. Pat. No. 4,113,449 discloses a two step process. First, the pressure of the gases flowing through the bags is reduced. Next the bags are blasted with high pressure gas to dislodge collected particles. Another method uses vibration. However, over time the bags become so heavily clogged with material that they must be replaced.

The first step in replacing the bags is removal of the cages mounting the filtration bags from the baghouse. Once removed from the baghouse, prior art methods for replacing bags require manually stripping or pulling the bags from the cages. Bent or damaged cages are generally discarded as scrap metal. This manual procedure has many drawbacks. For example, if the baghouse is intended to filter hazardous waste, the individuals stripping the bags are exposed directly to the waste in question. Therefore, cumbersome, expensive protective equipment is required. Additionally, cages are often bent during the stripping process. As a result, cages that would be perfectly serviceable, if a less forceful method was employed, are rendered scrap metal. Cages are also damaged when the new bags are installed. To manually install a bag requires that the cage be handled a great deal, risking bending the cage or breaking welds. Finally, possibly the greatest drawback is costs. The value of a cage as scrap metal, in comparison to the cost of a new cage, is minuscule. The manhours involved in this manual process are significant. Additionally, while the filter cartridges are removed the baghouse will not be operational. In some circumstances this can result in downtime for a significant portion if not an entire plant.

Hence, it is desirous to provide a process for replacing baghouse filter bags which strips the bag from the cage without damaging the cage. Additionally, it is desirous to straightening bent cages and to repair damaged cages, allowing continued use. For example, welds holding the cages together are often destroyed due to continual exposure to vibration in the baghouse. Welds may also be broken during removal from the bag house or during subsequent handling such as the aforementioned straightening procedure. Preferably the bags will be stripped from the cages in such a way that direct contact with materials captured in the bags will be avoided. Furthermore, it is desirous to suppress dispersion of the material in the bags into the air. Finally, it would be beneficial if the process could be carried out in such a manner that downtime was reduced as well as costs generally.

SUMMARY OF THE INVENTION

Our Process for Rejuvenating Baghouse Filter Cartridges strips the bag from the cage without damage to the cage. Cages that are already bent are straightened for continued use. A highly pressurized stream of water produced by a water knife is used to cut the bags. Hence, direct contact with materials captured in the bags is avoided. The water and associated mist will suppress dispersion of the material in the bags into the air. The process can rapidly be accomplished in an assembly line fashion to reduce downtime. The process involves three major steps.

First, after removal from the baghouse, the cartridges are passed through a cutting chamber to slit the bag for removal from the cage. A water knife is angularly deployed in a wall of the tubular cutting chamber. Using a water knife prevents damage to the cage and unnecessary disturbance of material captured in the bag. Water draining from the cutting chamber can be channeled to a hazardous waste disposal area if necessary. The angle of the water knife and the size of the water knife's jet can be varied according to the composition of the bags.

Second, upon inspection damaged cages will be repaired. Bent cages are straightened on a rigidly mounted mandrel employing a translational press. The cages are slid onto the mandrel. Then the translational press compresses them between two hemicylindrical dies to the contour of the mandrel. The press can then slide along its mounting track to another section of cage. Cages having broken welds whether initially or as a result of the straightening process are rewelded.

Finally, new bags are installed on the cages. In turn, each cage is positioned over an open ended tubular manifold. The new bag is started onto the end of the cage. Slightly pressurized, high volume air is into the manifold via a tuyere. The bag begins to inflate. Preferably, the air used to inflate the bag is warmer than ambient air. This softens the bag and makes it more pliable. The inflated bag is then floated onto the cage. The rejuvenated cartridges are remounted in the baghouse.

Preferably the specially designed equipment to carry out the process is transported on and deployed in conjunction with a trailer. The trailer comprises several structures to accommodate the equipment, such as the tuyere and a flange to mount the mandrel. Additionally, pumps may be mounted on the trailer or transported on it. Finally, racks and other structures to carry elements of the equipment are also preferably part of the trailer.

Therefore, a primary object of the present invention is to provide apparatus and a process for rejuvenating baghouse filter cartridges.

Another object is to provide a process of the character described that removes old bags from their cage with a minimum of effort.

A related object is to provide a process that allows the bags to be removed with minimal disturbance of the material captured in the fabric of the old bag.

An object is to provide a method for rejuvenating baghouse cartridges that does not damage the baghouse cages.

A related object of the present invention is to provide a method for stripping baghouse bags from baghouse cages without damaging the cage.

A further related object of the present invention is to provide a method for installing new bags on baghouse cages without forcibly bending the cages.

Another object of the present invention is to allow for removal of the baghouse bags with a minimum of physical contact by human beings.

Particularly, an object of the present invention is to provide a method to remove baghouse bags using water to suppress the dispersion of hazardous materials confined in the material of the bag.

An object of the present invention is to provide a method to remove bags from cages using a water knife.

Another primary object of the present invention is to provide a process for rendering bent or deformed baghouse cages operable.

An object of the present invention is to provide a process for rejuvenating baghouse filter cartridges using a minimum of manhours.

An object of the present invention is to provide a process for rejuvenating baghouse filter cartridges requiring a minimum of downtime.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a flowchart showing the preferred steps of our Process for Rejuvenating Baghouse Filter Cartridges;

FIG. 2 is a fragmented, partially exploded isometric view of a typical baghouse illustrating removal of a baghouse cartridge;

FIG. 3 is a fragmentary isometric view of the apparatus employed in the slitting step of our process;

FIG. 4 is an enlarged, fragmentary side elevational view of the preferred cutting chamber;

FIG. 5 is an isometric view illustrating the straightening step employing a mandrel and translational press;

FIG. 6 is an enlarged fragmented end elevational view of the preferred translational press;

DETAILED DESCRIPTION

Figure 7:
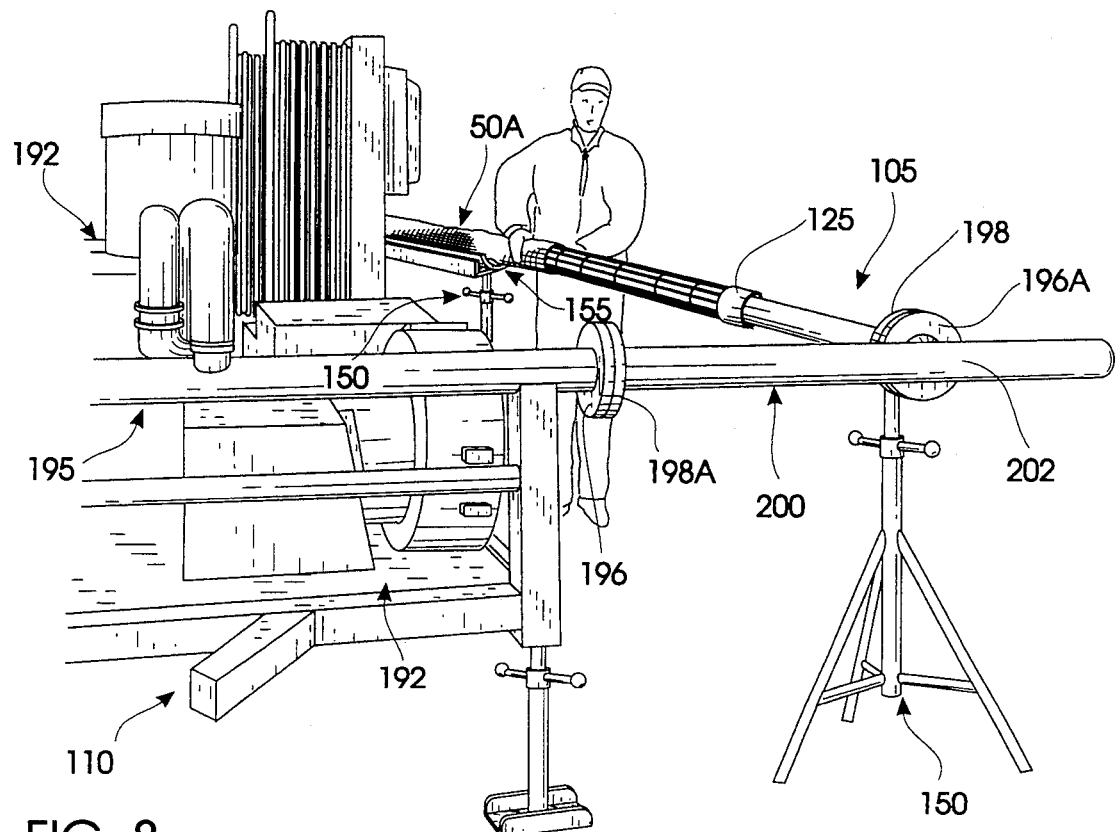
FIG. 7 is an isometric view illustrating installation of a new bag on a baghouse cage employing a manifold to inflate the bag for installation; and, FIG. 8 is an enlarged isometric view illustrating initial installation of a new bag.

With reference now to the accompanying drawings, our Process for Rejuvenating Baghouse Filter Cartridges is broadly designated by the reference numeral 20. As illustrated in the flow chart, (FIG. 1), our preferred process 20 involves step 25 of removing filtration cartridges 30 from the baghouse 40, a slitting step 45 removing the bags 50 from the cages 55, a straightening step 60, a repairing step 65, and inspection step 70, a bag installing step 75. New bags 50A are then installed on cages 55 in step 75, followed by baghouse reinstallation of the cartridges in step 80. Steps 60 and 65 are optional, as explained below. Several pieces of specialized equipment including a cutting chamber 85 (FIGS. 3 and 4), a translational press 90 with mandrel 100 (FIGS. 5 and 6) and an inflation manifold 105 (FIGS. 7 and 8) are specially adapted to carry out the aforementioned steps. In its preferred embodiment the equipment is transported on and deployed in conjunction with a trailer 110. The trailer has several structures to accommodate the equipment.

A typical baghouse 40 is illustrated in FIG. 2. It generally comprises an inlet plenum 115 in air flow communication, through an array of cartridges 30, with an outlet plenum 117. The cartridges are comprised of a generally tubular, skeletal cage 55 with a semipermeable filter bag 50 disposed over it. The cages 55 are usually constructed from stainless steel and are comprised of elongated, round longitudinal spines 118 welded to generally circular hoops 118A. Both the spines 118 and hoops 118A are constructed of relatively rigid stainless steel wire. One end of the cage 55 is usually capped by a circular plate 119. Various mounting systems are used to anchor cartridges 30 in baghouse structures 40. Generally speaking, the cages 55 are mounted to a tube sheet 120 which is a flat plate separating the inlet plenum 115 from the outlet plenum 117. The tube sheet 120 has a plurality of cage receptive orifices 122 defined in it. The cartridges 30 are usually either clamped in place or a series of indents in the tube sheet 120 mate with grooves 123 defined in a shroud 125 on the cage 55 holding the cartridge 30 in place. The first step 25 in carrying out the present process 20 is to remove the cartridges 30 from the baghouse 40.

Next, the bags 50 are slit to remove 45 them from the cages 55. The cartridges 30 are passed longitudinally through a cutting chamber 85 to slit the bags 50. The cutting chamber 85 is comprised of a generally tubular housing 130 of a diameter sufficient to allow passage of the cartridges 30. Two or more angularly disposed conduits 132, 135 pass through the wall 137 of the housing 130. A water knife 140 is mounted in the conduit disposed at the proper angle to cut the material of the particular bags 50 being processed. The tip of the water knife 140 is maintained approximately one-half inch from the bag 55. High pressure water is provided to the water knife through a hose 142 hooked to a high pressure water pump. The water knife comprises a generally tubular body threadably mounting a replaceable internal jet. The stream 143 from the water knife 140 contacts the material of the bag 50 and cuts it cleanly with minimum disturbance of the substance captivated in the bag 50 and without harming the cage 55. A drain 145 is provided for the cutting chamber 85 at its lower extreme. This drain 145 can be connected to an on site hazardous waste disposal area via a hose 147, if necessary. However, very little run-off is produced. Once the bag 50 is slit it is removed from the cage 55 and properly disposed of in compliance with environmental regulations. Preferably, the cutting chamber 85 is set up on a plurality of variable height stands 150. Additionally, a trough 155 is preferably disposed at either end of the cutting chamber 85 on a set of stands 150 to facilitate passage of the cartridges 30 through the cutting chamber 85.

The cage 55 is then inspected 70 for straightness and other damage such as broken welds. Damaged cages 55A are separated 160, 161 from immediately reusable cages 55.

Bent, out of round or otherwise distorted cages 55A are sheathed on to a generally cylindrical mandrel 100 (FIG. 5). This mandrel 100 is mounted to a rigid support 160. Preferably the support 160 is disposed on the rear of the trailer 110. A mounting flange 162 on the support 160 mates with a mounting flange 164 on the mandrel 100. When a bent cage 55A is slid over the mandrel 100 it is somewhat straightened.

Final straightening of the cage is carried out by compressing it with a translational press 90. The press 90 is comprised of a track 165 supported on two or more stands 150 directly below the mandrel 100. A carriage 168, comprising a frame 170 and casters 172, carries the operative components of the press 90 along the track 165. The press 90 further comprises a pair of hemicylindrical dies 175, 177. The lower die 175 is affixed to the carriage frame 170. The second, upper die 177 is hinged 178 to the carriage frame 170. A pair of two-way hydraulic or pneumatic cylinders 180 extend from brackets 182 on the upper die 177 to pivot points 185 on the carriage frame 170. When the rams 187 of the hydraulic cylinders 180 retract the upper die closes toward the lower die 175 compressing the sheathed, damaged cage 55A to the contour of the mandrel 100, thereby straightening it.

Next, any welds that were originally found broken during inspection 70 or which were broken during straightening 60 are rewelded 65 employing the necessary welding procedure. Since most modern baghouse cages 55 are constructed of stainless steel, a MIG welding process is preferably employed.

Figure 8:
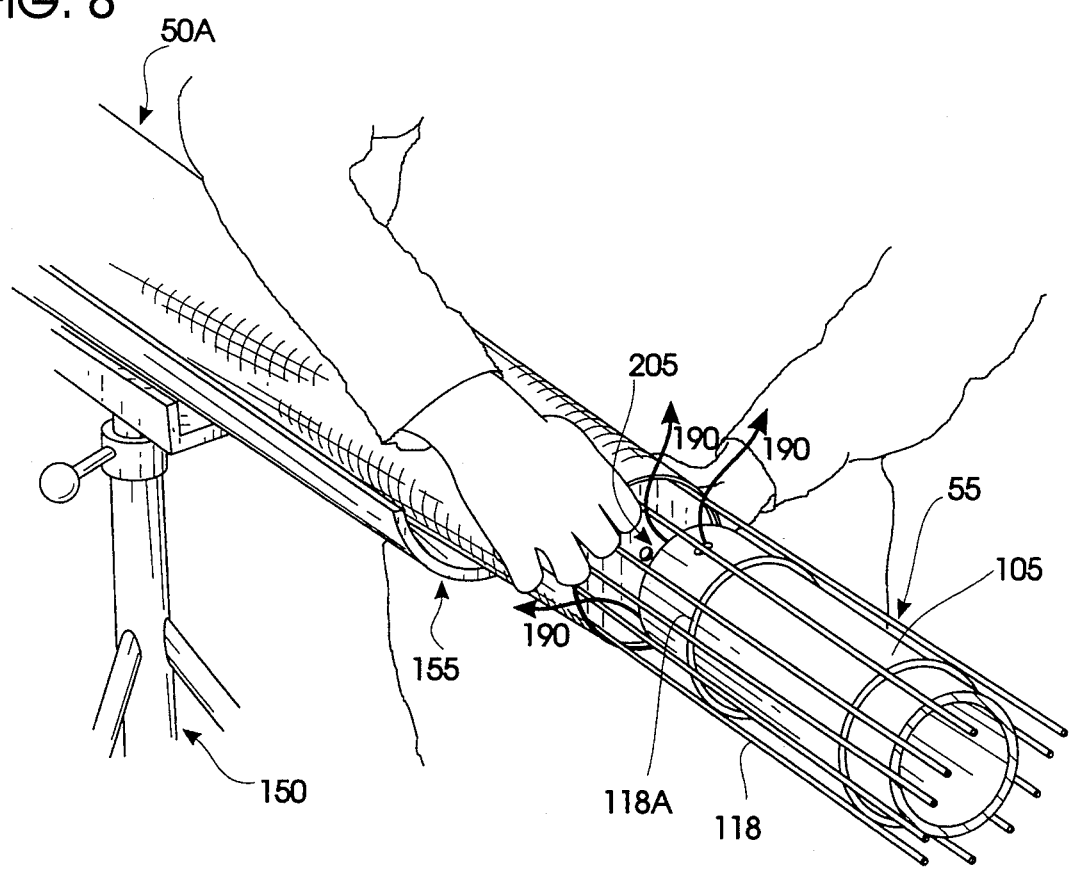

The next step 75 is to install new bags 50A on the cages 55. While damaged cages 55A are being straightened 60 and/or rewelded 65, new bags 50A may be installed 75 on straight cages 55. To install a new bag 50A the cage 55 is positioned over an open ended tubular manifold 105. A slightly pressurize high volume air flow 190 is provided through the manifold 105 by a pump 192. Preferably, the pump 192 is mounted to the front of the trailer 110 and supplies the pressurized air 190 via a tuyere 195 spanning the front of the trailer 110. Flanges 196 are disposed on either end of the tuyere 195. If only one inflation manifold 105 is to be employed, a cap with a rubber seal is disposed over one of the flanges 196 sealing it. A flange 198 on the end of the manifold 105 mates with the tuyere flange 196 to provide airflow communication between the pump 192 and the manifold 105. To facilitate use of the preferred trailer 110 a tuyere extension elbow 200 can be employed as illustrated in FIG. 7. The tuyere extension elbow 200 comprises a closed end tubular body 202 and two perpendicular flanges 196A, 198A. The input flange 198A is adapted to couple with the tuyere flange 196. The perpendicularly oriented output flange 196A is adapted to mate with the manifold flange 198, allowing the manifold 100 to be positioned generally parallel to the trailer 110. The manifold is supported near the flange 198 by a stand 150. A trough 155 is disposed in alignment with the open end 205 of the manifold 100 to support the new bag 50A to be installed.

As air is pumped through the manifold 105 the new bag 50A is slipped over the end of the cage 55. Once the bag 50A is inflated it is slid over the remaining portion of the cage 55. Inflation of the bag 50A reduces drag on the bag 50A caused by contact with the spines of the cage 55 as it is installed. Preferably, the air 190 used to inflate the bags 50A is warmer than ambient air, softening the bag 50A and making it more pliable.

Once the bag 50A is slid over the cage 55 it is appropriately anchored for the particular application. Then the rejuvenated cartridge 30 is remounted in the baghouse 40 in the appropriate manner.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for rejuvenating baghouse filter cartridges comprising a filtration bag disposed on an elongated cage, said process comprising the steps of::

(a) slitting the filtration bags, employing pressurized liquid to cut said filtration bags, and removing them from said cages;
(b) preparing said cages to receive new filtration bags by;
  (1) separating undamaged cages;
  (2) straightening bent cages; and,
  (3) rewelding broken welds on said cages; and,
(c) installing a new filtration bag on each cage.

2. The process as defined in claim 1 wherein said liquid is directed through a water knife.

3. The process as defined in claim 1 wherein said slitting step (a) comprises the steps of longitudinally passing said filter cartridges a through a generally tubular cutting chamber and cutting the bags within the chamber with a water knife.

4. The process as defined in claim 3 wherein a fluid passageway intersects said chamber at an angle, and said angle is varied according to the material comprising said bag.

5. The process as defined in claim 4 wherein said water knife comprises a nozzle, and the size of said nozzle is varied according to filter bag material.

6. A process for rejuvenating baghouse filter cartridges comprising a filtration bag disposed on an elongated cage, said process comprising the steps of:
(a) slitting the filtration bags and removing them from said cages;
(b) preparing said cages to receive new filtration bags by;
  (1) separating undamaged cages;
  (2) straightening bent cages by;
    (A) temporarily coaxially fitting bent cages to a rigid generally cylindrical mandrel; and,
    (B) compressing said cage about said mandrel to straighten said cage; and,
  (3) rewelding broken welds on said cages; and,
(c) installing a new filtration bag on each cage.

7. The process as defined in claim 6 wherein said compressing step is carried out by a press comprising a pair of generally hemicylindrical dies adapted to be forced together.

8. A process for rejuvenating baghouse filter cartridges comprising a filtration bag disposed on an elongated cage, said process comprising the steps of:
(a) slitting the filtration bags and removing them from said cages;
(b) preparing said cages to receive new filtration bags by;
  (1) separating undamaged cages;
  (2) straightening bent cages; and,
  (3) rewelding broken welds on said cages; and,
(c) installing a new filtration bag on each cage by;
  (1) positioning cages on a manifold;
  (2) mating new bags to an open end of said manifold;
  (3) inflating each of said new bags with air transmitted through said manifold; and,
  (4) sliding said inflated, new bags over said cages.

9. The process as defined in claim 8 wherein said inflating step employs warm air.

10. A recycling process for rejuvenating baghouse filter cartridges comprising a filtration bag disposed on an elongated cage, said process comprising the steps of:
(a) passing said filter cartridges through a generally tubular cutting chamber to sever the filtration bags using pressurized liquid and remove them from said cages;
(b) separating repairable cages from undamaged and unrepairable cages;
(c) scrapping unrepairable cages;
(d) repairing repairable cages, said repairing step comprising the steps of rewelding broken welds and/or straightening bent cages;
(e) providing recyclable cages from repaired and said undamaged cages; and,
(f) installing a new filtration bag on each of said recyclable cages.

11. The process as defined in claim 10 wherein said liquid is directed through a water knife.

12. A recycling process for rejuvenating baghouse filter cartridges comprising a filtration bag disposed on an elongated cage, said process comprising the steps of:
(a) passing said filter cartridges through a generally tubular cutting chamber to sever the filtration bags and remove them from said cages;
(b) separating repairable cages from undamaged and unrepairable cages;
(c) scrapping unrepairable cages;
(d) repairing repairable cages, said repairing step comprising the steps of rewelding broken welds and/or straightening bent cages by temporarily coaxially fitting bent cages to a rigid generally cylindrical mandrel and compressing said cage about said mandrel to straighten said cage;
(e) providing recyclable cages from repaired and said undamaged cages; and,
(f) installing a new filtration bag on each of said recyclable cages.

13. The process as defined in claim 12 wherein said compressing step is carried out by a press comprising a pair of generally hemicylindrical dies adapted to be forced together.

14. A recycling process for rejuvenating baghouse filter cartridges comprising a filtration bag disposed on an elongated cage, said process comprising the steps of:
(a) passing said filter cartridges through a generally tubular cutting chamber to sever the filtration bags and remove them from said cages;
(b) separating repairable cages from undamaged and unrepairable cages;
(c) scrapping unrepairable cages;
(d) repairing repairable cages, said repairing step comprising the steps of rewelding broken welds and/or straightening bent cages;
(e) providing recyclable cages from repaired and said undamaged cages; and,
(f) installing a new filtration bag on each of said recyclable cages by;
  (1) positioning recyclable cages on a manifold;
  (2) mating new bags to an open end of said manifold;
  (3) inflating each of said new bags with air transmitted through said manifold; and,
  (4) sliding said inflated, new bags over said recyclable cages.

15. The process as defined in claim 14 wherein said inflating step employs warm air.

* * * * *